United States Patent [19]
Matsuda et al.

[11] Patent Number: 5,153,481
[45] Date of Patent: Oct. 6, 1992

[54] DISPLAY DEVICE WITH DISPLAY SCREEN AND OPTICAL FILM ON THE DISPLAY SCREEN

[75] Inventors: Hidemi Matsuda, Oomiya; Takeo Itou, Kumagaya; Kazuhiko Shimizu, Fukaya, all of Japan

[73] Assignee: Kabushiki Kaisha Toshiba, Kawasaki, Japan

[21] Appl. No.: 664,666

[22] Filed: Mar. 5, 1991

[30] Foreign Application Priority Data

Mar. 9, 1990 [JP] Japan .................................. 2-56492

[51] Int. Cl.$^5$ .......................... H01J 31/00; H04N 5/72
[52] U.S. Cl. ...................................... 313/479; 313/478; 358/252; 358/253; 359/601; 359/885; 359/893
[58] Field of Search ................ 313/478, 479; 358/252, 358/253; 359/601, 885, 893

[56] References Cited

FOREIGN PATENT DOCUMENTS

| | | |
|---|---|---|
| 61-10043 | 1/1986 | Japan . |
| 61-29051 | 2/1986 | Japan . |
| 2-72549 | 3/1990 | Japan .................................. 313/479 |

*Primary Examiner*—Donald J. Yusko
*Assistant Examiner*—Diab Hamadi
*Attorney, Agent, or Firm*—Cushman, Darby & Cushman

[57] ABSTRACT

A display device comprising a display screen, and an optical film formed on the display screen and having a porous lower layer mainly consisting of $TiO_2$ and having a porosity of 30% to 75% and an average pore size of 10 nm or less and an upper layer stacked on the lower layer and essentially consisting of a silicon compound having a fluorine-containing group and a siloxane bond. In this display device, the optical film can be easily formed and has a satisfactory anti-reflection effect and satisfactory strength.

16 Claims, 6 Drawing Sheets

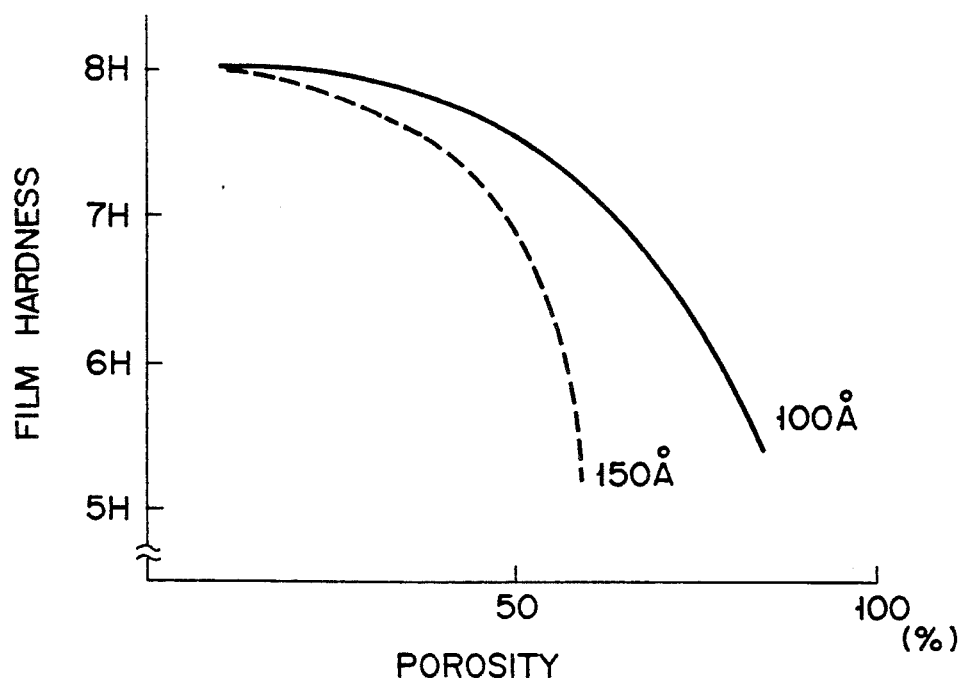
F I G. 2
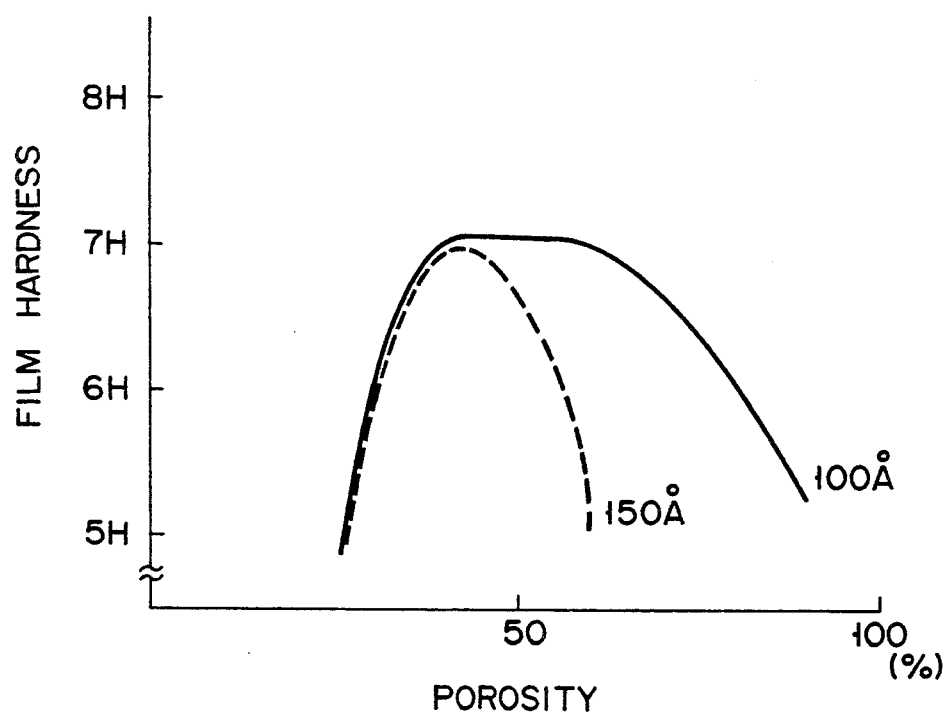
F I G. 3

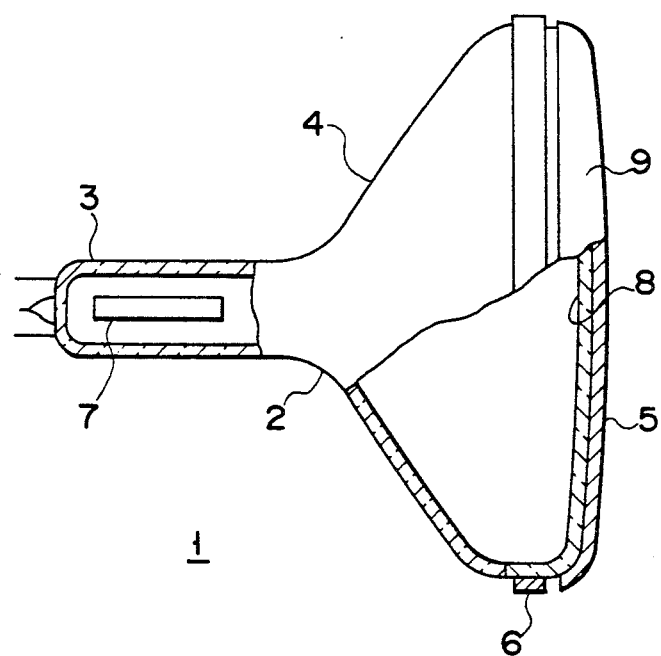
F I G. 6
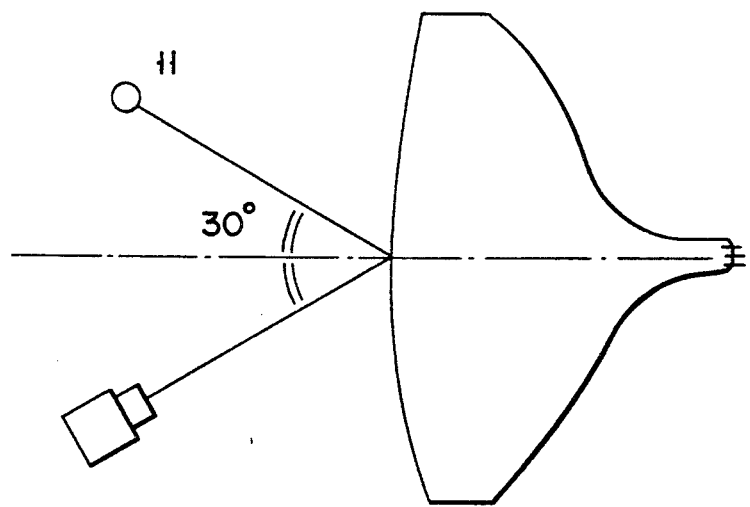
F I G. 7

DISPLAY DEVICE WITH DISPLAY SCREEN AND OPTICAL FILM ON THE DISPLAY SCREEN

BACKGROUND OF THE INVENTION

1. Field of the Invention

The present invention relates to a display device and, more particularly, to a display device having an optical film on the front surface of its display screen.

2. Description of the Related Art

Since a display screen of a display device is generally a glass screen, it causes a phenomenon in which clearness of an image formed from inside the display device is degraded by primary reflection of ambient light from the display screen or the like.

For example, since a faceplate outer surface of a cathode-ray tube is normally a smooth glass surface, if light from an ambient light source is primarily reflected by the faceplate outer surface, an image formed from inside the faceplate overlaps the reflected light to largely degrade its clearness.

Means for solving the above problem are roughly classified into two means. The first means is a method of scattering ambient light by forming fine projections and recesses on the faceplate outer surface, as disclosed in Published Unexamined Japanese Patent Application No. 61-29051. In this method, however, the entire screen is whitened to decrease the contrast of an image. In addition, the resolution of an image is also decreased. The second means is a method of preventing reflection by forming a single or multilayered optical film on the faceplate outer surface. This method can provide a satisfactory strength and a non-reflection condition without largely decreasing the contrast and resolution of an image. However, it is difficult to easily form an optical film.

That is, in the case of a single layer, such an optical film is formed of a substance having a refractive index lower than that of glass constituting the display screen. The reflection condition is represented by $n_1^2 = n_0 n_2$ where $n_1$ is the refractive index of a thin layer, $n_0$ is the refractive index of air, and $n_2$ is the refractive index of the display screen of the display device.

For example, the display screen of a cathode-ray tube consists of glass, and its refractive index $n_2$ is about 1.52. Since the refractive index $n_0$ of air is 1.00, the refractive index $n_1$ of an optical film which satisfies the non-reflection condition is preferably 1.23. In general, however, almost no substance having such a refractive index is known. For this reason, it is difficult to obtain an optical film which satisfies the non-reflection condition with a single layer.

If the antireflection film has a two-layered structure, however, the non-reflection condition is $n_0 n_2 = n_1 n_3$ where $n_0$ is the refractive index of a substrate of the display screen, $n_1$ is the refractive index of a lower layer, $n_2$ is the refractive index of an upper film, and $n_3$ is the refractive index of air. In the case of a cathode-ray tube, a value of $n_1/n_2 = 1.23$ is obtained by substituting for $n_0$ and $n_3$, 1.52, the refractive index of glass, and 1.00, of the refractive index of air, respectively. That is, in order to satisfy the non-reflection condition, it is ideal to form an optical film having a two-layered structure in which a refractive index ratio of the lower to upper layer is 1.23 on the faceplate outer surface of a cathode-ray tube.

A vapor deposition method or a sputtering method is well known as a method of forming such an optical film. To apply these methods to a comparatively large substrate such as a display screen of a display device, however, is not practical since they require a comparatively large system. In order to form an optical film on such a large substrate, therefore, a method of forming a film by coating a solution containing a film formation material on a substrate of a display screen and drying the solution is much easier than the above methods. As such a formation method, a so-called solgel method, is often used. In this method, a metal alkoxide, for example, is used as a starting material and subjected to hydrolysis and dehydrating condensation to obtain a metal compound as a condensate.

Published Unexamined Japanese Patent Application No. 61-10043 discloses a method in which a lower layer consisting of a co-condensate of an oxide-based compound of Ti or Zr such as an alkoxide of Ti or Zr and an $SiO_2$-based compound such as an alkoxide of Si is formed on a glass substrate, and an upper layer consisting of a fluorine-containing silicon compound obtained from alkoxysilane or chlorosilane containing a polyfluoroalkyl group is formed on the lower layer, thereby obtaining an antireflection film which satisfies the non-reflection condition. The co-condensate constituting the lower layer is obtained by two processes of hydrolysis and dehydrating condensation of a metal compound. If an alkoxide is used as the metal compound, the two processes are represented by the following reaction formulas:

Hydrolysis:

Dehydrating condensation:
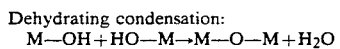

wherein each of n and x represents a natural number, M represents a metal element, and R represents an alkyl group.

The hydrolysis rate of a metal alkoxide largely changes in accordance with the type of a metal. For example, the hydrolysis rate of an Si alkoxide is lower than that of a Ti or Zr alkoxide. When an oxide of Si and Ti or Si and Zr is to be formed, therefore, since a Ti or Zr alkoxide is selectively hydrolyzed earlier in the starting solution, the composition of a formed thin layer becomes non-homogeneous. For this reason, no satisfactory strength can be obtained by a film formed by the invention described in Published Unexamined Japanese Patent Application No. 61-10043.

As described above, in the conventional display devices, if fine projections and recesses are formed on a display screen of the device in order to prevent primary reflection on the display screen, the contrast or resolution of an image is degraded. In addition, if an antireflection film is to be formed by a single layer, a substance having a refractive index which satisfies the non-reflection condition is not available. Even if a two-layered structure is adopted, a film having satisfactory strength and capable of being easily formed cannot be obtained.

SUMMARY OF THE INVENTION

The present invention has been made to solve the above problems of the conventional display devices and has as its object to provide a display device comprising an optical film which can be easily formed and has a satisfactory antireflection effect and satisfactory strength.

According to the present invention, there is provided a display device comprising:

a display screen; and an optical film formed on the display screen and having a porous lower layer mainly containing $TiO_2$ and having a porosity of 30% to 75% and an average pore size of 10 nm or less and an upper layer stacked on the lower layer and containing a silicon compound having a fluorine-containing group and a siloxane bond.

In this display device, the optical film can be easily formed and has a satisfactory antireflection effect and satisfactory strength.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a graph showing a relationship between the porosity and the film hardness of a $TiO_2$ film;

FIG. 3 is a graph showing a relationship between the porosity and the film hardness of a $TiO_2$ film having an upper layer;

FIG. 6 is a partially cutaway side view showing a practical structure of a cathode-ray tube according to the present invention;

FIG. 7 is a schematic view for explaining a method of measuring specular reflection;

DETAILED DESCRIPTION OF THE PREFERRED EMBODIMENTS

A display device of the present invention comprises a display screen having a two-layered optical film essentially constituted by a lower layer and an upper layer. The lower layer is formed on the display screen and essentially consists of a porous layer mainly consisting of $TiO_2$ and having a porosity of 30% to 75% and an average pore size of 10 nm or less. The upper layer is formed on the lower layer and essentially consists of a silicon compound having a fluorine-containing group and a siloxane bond.

The upper layer can be obtained by performing hydrolysis and dehydrating condensation for alkoxysilane having a fluorine-containing group. Examples of a compound constituting the upper layer are $CF_3CH_2CH_2Si(OMe)_3$, $CF_3(CF_2)_5CH_2CH_2Si(OMe)_3$, $CF_3(CF_2)_7CH_2CH_2Si(OMe)_3$, $CF_3(CF_2)_7CH_2CH_2SiMe(OMe)_2$, and $(MeO)_3SiCH_2CH_2(CF_2)_6CH_2CH_2Si(OMe)_3$ (wherein Me represents a methyl group). Said alkoxysilane is not limited to metoxysilane such as etoxysilane proposysilane, butoxysilane or phenoxysilane can be used. An upper layer consisting of such a substance has excellent characteristics in water repellency and stain resistance. In addition, since the surface of the upper layer is smooth, its apparent strength is advantageously increased. Therefore, this upper layer has characteristics suitable as a surface layer used in various environments.

The upper layer is conventionally used as an antireflection film of a substrate consisting of, e.g., plastic but is not used on a transparent substrate such as a glass plate because no satisfactory antireflection effect can be obtained. The refractive index of the upper layer is about 1.3 to 1.43 although the value depends on the content of fluorine. When a glass display screen and an upper layer having such a refractive index are used, in order to obtain an optical film having a refractive index of about 1.23 as a non-reflection condition, the refractive index of the lower layer must be at least 1.5 to 2.0, and preferably, 1.6 to 1.8.

The present inventors have studied various types of thin layers having such a refractive index. Although satisfactory strength can be obtained when a thin layer is formed by using only an alkoxide of Ti, the refractive index of the layer is about 2.5 to 2.9, i.e., no desired value can be obtained. When a thin layer is formed by using only an alkoxide of Si, the refractive index of the layer is about 1.45, i.e., no desired value can be obtained.

Figure 1:
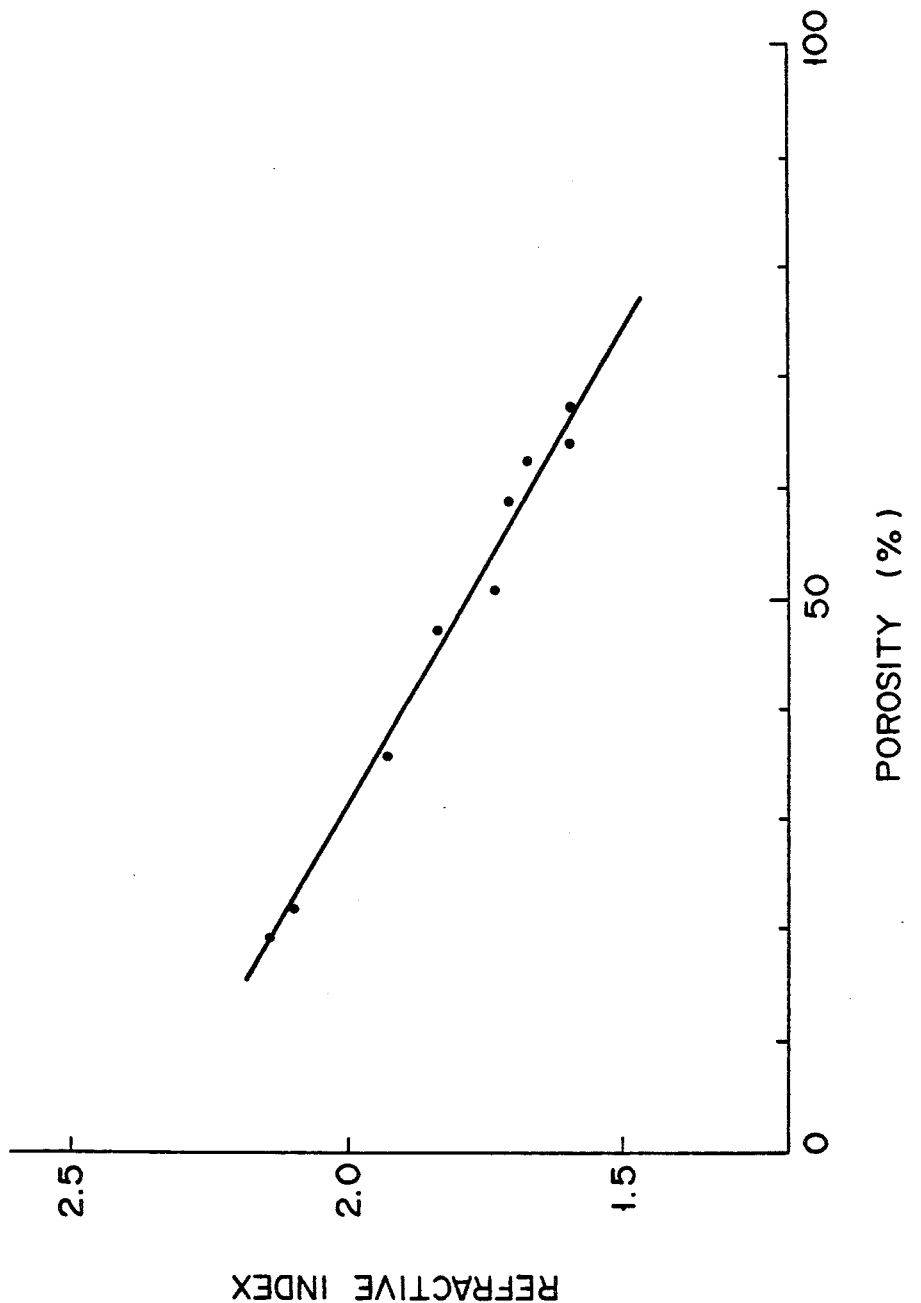
FIG. 1 is a graph showing a relationship between the porosity and the refractive index of a porous $TiO_2$ film.

The present inventors have found that when a Ti alkoxide is used as a starting material to form a thin layer under predetermined conditions, pores can be contained in the thin layer mainly consisting of $TiO_2$ and the refractive index of the layer can be adjusted to be a desired value. FIG. 1 is a graph showing a relationship between the porosity and the refractive index of a $TiO_2$ film containing pores. As is apparent from FIG. 1, the refractive index is decreased as the porosity is increased and vice versa. This graph reveals that the porosity of the lower layer for obtaining a desired refractive index of 1.5 to 2.0 is 30% to 75%, and preferably, 45% to 65%.

FIG. 2 is a graph showing relationships between the porosity and the film hardness obtained when average pore sizes of pores contained in a $TiO_2$ film are about 10 nm and about 15 nm. The film hardness is determined by a hardness test in accordance with the JIS standards in which the film is scratched with scratch value test pencils having predetermined hardness such as B, HB, H, 2H to 7H, and damage condition on the surface of the film is observed to determine the film hardness corresponding to the pencil hardness. When the average pore size is about 10 nm, although the film hardness is decreased as the porosity is increased, the film hardness is 6H or more, i.e., maintains a practically usable level up to the porosity of 75%. When the average pore size is about 15 nm, however, the porosity of 50% or more brings about abrupt decrease in film hardness and causes the film to be opaque.

Examples of the Ti alkoxide used in formation of the lower layer are $Ti(O-iC_3H_7)_4$, $Ti(OC_2H_5)_4$, and $Ti(O-tC_5H_{17})$.

FIG. 3 is a graph showing a relationship between the hardness and the porosity of an optical film in which an upper layer consisting of the upper layer is made of $SiO_2$ based compound in which one of four siloxane bond is replaced with a Rf group represented by $-CH_2CH_2(CF_2)_6 CH_2CH_2-$, Si atoms at both ends of Rf group sharing the Rf group, is formed on a $TiO_2$ film.

As is apparent from FIG. 3, when the average pore size of the lower layer is about 10 nm and the porosity is low, the hardness of the entire optical film is decreased although the hardness of only the lower layer is increased. The reason for this can be assumed as follows.

Figure 4:
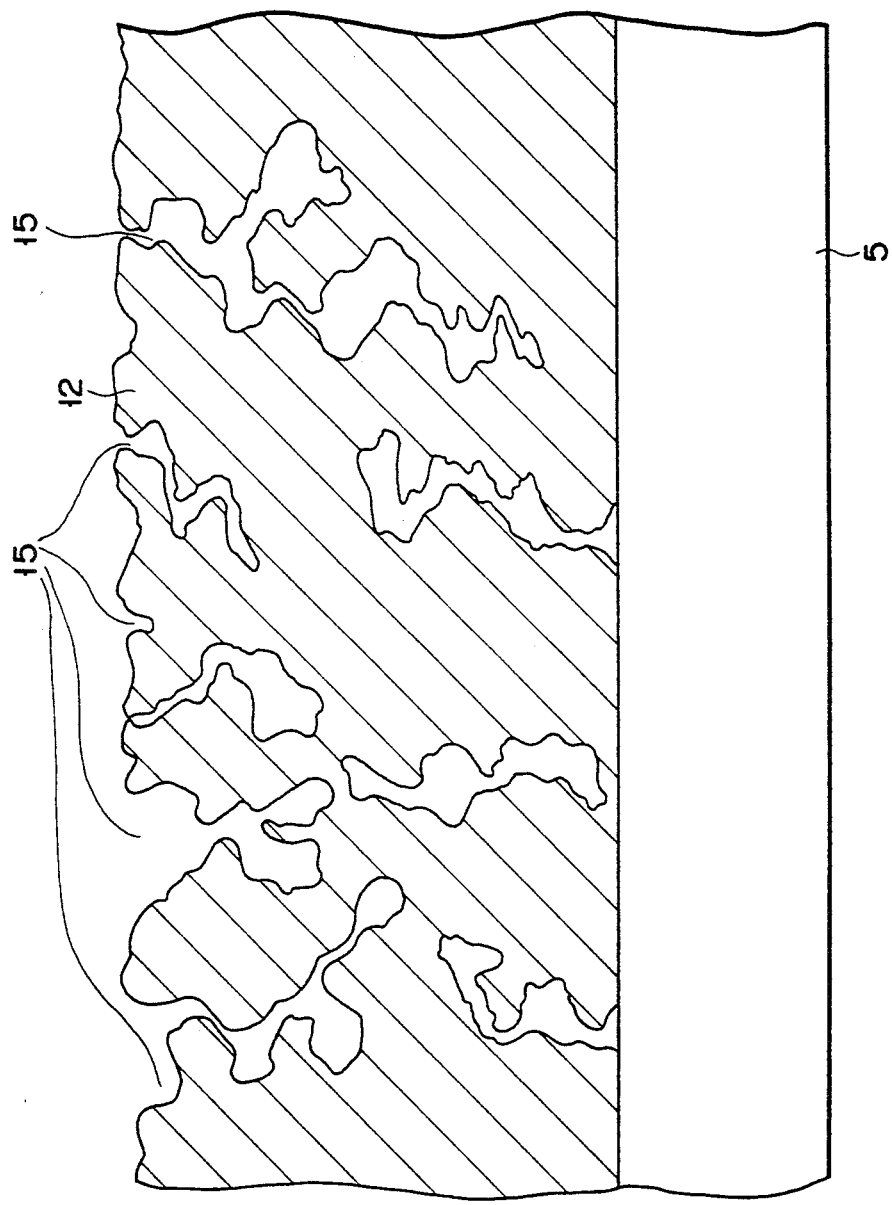
FIG. 4 is a sectional view showing a lower layer of an optical film according to the present invention.
Figure 5:
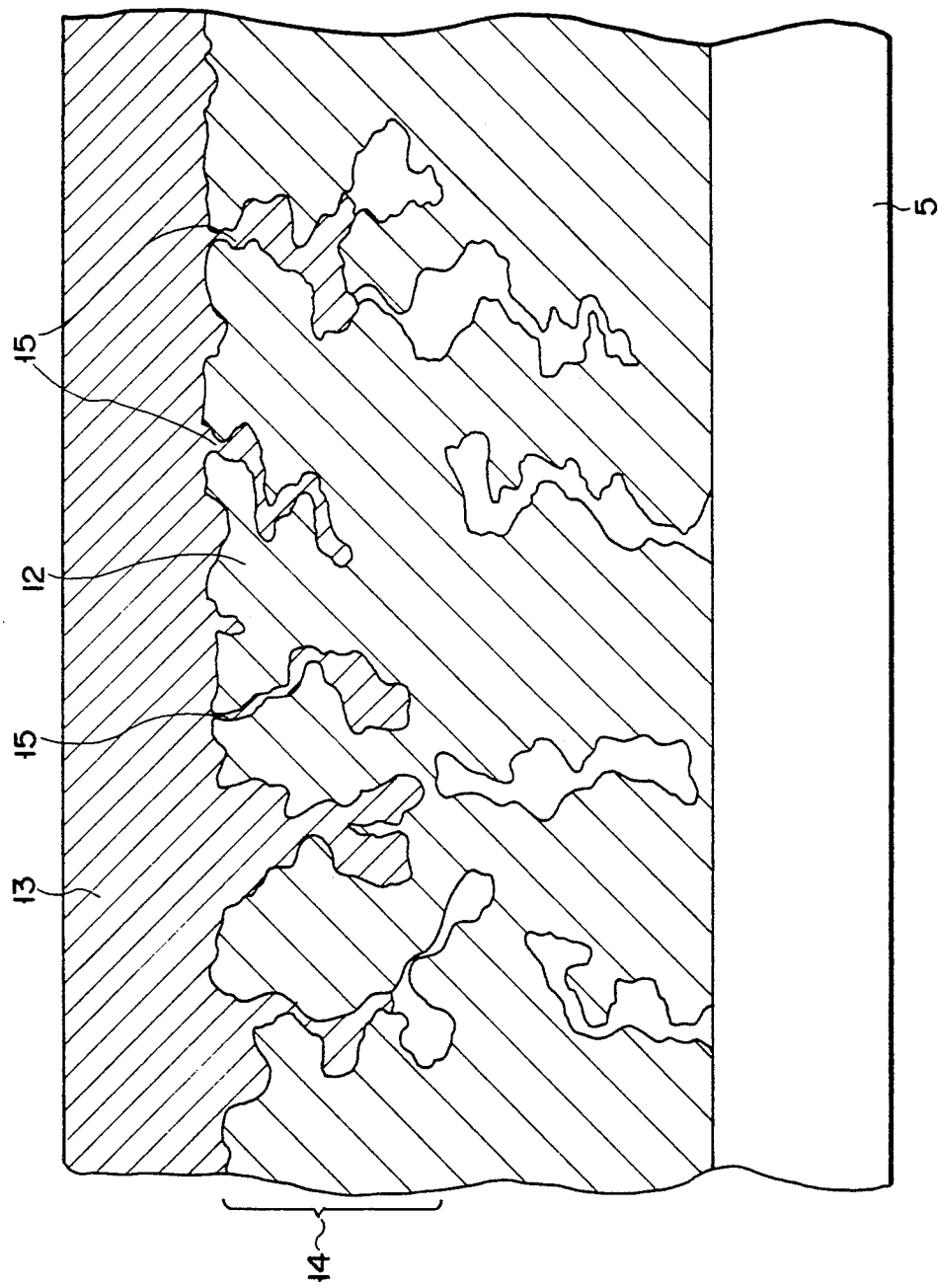
FIG. 5 is a sectional view showing an embodiment of an optical film according to the present invention.

FIG. 4 is a sectional view showing a structure in which the lower layer of an optical film according to the present invention is formed on a faceplate. Note that in FIG. 4, pores 15 are illustrated in an enlarged scale for convenience in explanation. When an upper layer formation solution is coated on a porous lower layer 12 as shown in FIG. 4, a portion of the solution enters into the pores 15. After the layers were baked, an optical film having a two-layered structure including a portion in which an upper layer 13 partially enters into the pores 15 of the lower layer 12 is formed, as shown in FIG. 5. As is apparent from FIG. 5, an intermediate layer 14 in which both the lower and upper layers 12 and 13 are present is formed near a boundary between the lower and upper layers 12 and 13. It is assumed that this intermediate layer 14 increases an adhesive force between the lower and upper layers 12 and 13 and the film hardness is increased accordingly.

As described above, it is assumed that the hardness of an optical film, especially, the hardness of an upper layer of the film is decreased when the porosity of a lower layer is decreased. In addition, although the adhesive force between the lower and upper layers is increased when the porosity is increased, it is assumed that the hardness of the entire optical film is decreased because the hardness of the lower layer is decreased.

As is apparent from FIG. 3, in an optical film having an average pore size of about 10 nm, when the porosity is about 30% to 80%, a practical film hardness of 6H or more can be obtained. In an optical film having an average pore size of about 15 nm, when the porosity is 30% to 55%, a film hardness of 6H can be obtained. Note that although this value is obtained when the upper layer is made of $SiO_2$ based compound in which one of four siloxane bond is replaced with a Rf group represented by $-CH_2CH_2(CF_2)_6 CH_2CH_2-$, Si atoms at both ends of the Rf group are used as an upper layer, substantially the same values can be obtained with another silicon compound having a fluorine-containing group and a siloxane bond.

As described above, the lower layer of the optical film according to the present invention is a porous thin layer mainly consisting of $TiO_2$, and the average pore size of the lower layer is preferably 10 nm or less. Since the film hardness is easily decreased when the average porosity is too small, the average pore size is preferably 5 to 10 nm. Since a solution for forming this lower layer mainly consists of an alkoxide of Ti, a conventional optical film formed by using two types of alkoxides has a problem of non-homogeneity in film composition caused by a difference between hydrolysis rates. An optical film according to the present invention, however, poses no such problem. In addition, satisfactory strength can be obtained by setting the average pore size and the porosity of the lower layer to fall within desired ranges.

Within a wavelength range of 400 to 650 nm, the optical film according to the present invention preferably has a peak in a wavelength range of $575\pm20$ nm and light absorbing characteristics which satisfy the following relations:

$$T_{min} \leq T_{550} < T_{530}$$

$$1 \leq T_{450}/T_{530} \leq 2$$

$$1 \leq T_{630}/T_{530} \leq 2$$

$$0.7 \leq T_{450}/T_{630} \leq 1.43$$

assuming that transmittances with respect to light having wavelengths of 450, 530, 550, and 630 nm and a peak are $T_{450}$, $T_{530}$, $T_{550}$, $T_{630}$, and $T_{min}$.

The above light absorbing characteristics are effective especially when the optical film is applied to a cathode-ray tube. The reason for this is as follows.

The optical film applied to a cathode-ray tube can absorb external light most effectively by shielding light having a wavelength of $575 \leq 20$ nm. However, reduction in luminance must be minimized. Therefore, it is important that the optical film has a maximum transmittance near 450 nm and 630 nm at which visual sensitivity is lowest and luminescent energies of red and blue phosphors used in a cathode-ray tube are high, a minimum transmittance near 575 nm at which the luminescent energies of the phosphors are low, and a medium transmittance near 530 nm at which visual sensitivity is high and which is the peak of a luminescent energy of a green phosphor.

In addition, within the range of 575 to 530 nm, an energy of external light near 550 nm is higher than that at 530 nm, and a luminescent energy of a green phosphor near 550 nm is lower than that at 530 nm. In the characteristics of this optical film, a light transmittance between 575 and 530 nm is preferably set to be lower than that at 530 nm. That is, assuming that transmittances with respect to light having wavelengths of 450 nm, 530 nm, 550 nm, and 630 nm and a peak are $T_{450}$, $T_{530}$, $T_{550}$, $T_{630}$, and $T_{min}$, respectively, the contrast of an image can be improved with a maximum efficiency by setting filter characteristics to satisfy relations of $T_{min} \leq T_{550} < T_{530}$ and $T_{530} \leq T_{630}$.

Furthermore, is it confirmed that body color control of the optical film is improved to be a practical level by limiting the ratios of transmittances at the respective wavelengths to satisfy the following equations (1) to (3):

$$T_{450}/T_{530} = 1 \text{ to } 2 \tag{1}$$

$$T_{630}/T_{530} = 1 \text{ to } 2 \tag{2}$$

$$T_{450}/T_{630} = 0.7 \text{ to } 1.43 \tag{3}$$

In the above relations, if the value of equation (1) exceeds 2 or the value of equation (3) is lower than 1.43, a bluish body color is obtained. If the value of equation (2) exceeds 2 or the value of equation (3) is lower than 1, since the improvement in contrast is reduced and the value of BPC is decreased, these values are not practical.

The above light absorbing characteristics can be obtained by adding a coloring material such as a dye or an organic or inorganic pigment to at least one of the upper and lower layers of the optical film. Examples of the dye are acid-rhodamine B and rhodamine B, examples of the organic pigment are lakes of these dyes, and an example of the inorganic pigment is a mixture of cobalt aluminate and cadmium red.

The upper layer used in the present invention is effective as a protection film especially in an optical film containing such a coloring material. The upper layer has excellent characteristics in water repellency and stain resistance as described above and therefore can prevent ingress of, e.g., water or a chemical substance into the optical film. For this reason, the light selective absorbency and the environmental resistance can be largely improved.

In addition, by adding a water-absorbing metal salt to an optical film used in the present invention, antistatic properties can be imparted to the optical film. This water-absorbing metal salt in the optical film absorbs moisture in air and imparts conductivity to the optical film.

Although any metal salt can be used as the water-absorbing metal salt as long as it has water absorbency, typical examples of the metal salt are salts of an alkali metal and an alkali earth metal. More specifically, examples are a nitrate, a chlorate, a sulfate, and a carbonate of Li, K, Na, Ba, Sr, and Ca. These metal salts can be used singly or in the form of a mixture.

An embodiment in which a cathode-ray tube is used as a display device will be described below.

FIG. 6 is a partially cutaway side view showing a cathode-ray tube manufactured on the basis of the present invention. Referring to FIG. 6, a cathode-ray tube 1 has an evacuated air-tight glass envelope 2. This envelope 2 has a neck 3 and a cone 4 continuous to the neck 3. The envelope 2 further has a faceplate 5 which is sealed by the cone 4 and fret glass. An explosion-proof metal tension band 6 is wound on the periphery of the side wall of this faceplate 5. An electron gun 7 for radiating an electron beam is arranged in the neck 3. A phosphor screen 8 consisting of a phosphor layer which is excited by the electron beam from the electron gun 7 to emit light is formed on the inner surface of the faceplate 5. A deflecting unit (not shown) for deflecting the electron beam to scan the phosphor screen is mounted outside the cone 4.

An antireflection film 9 is formed on the outer surface of the faceplate 5 of the cathode-ray tube 1 to largely reduce primary reflection on the faceplate 5. This thin film 9 is manufactured as follows.

EXAMPLE 1

Solutions A and B having the following compositions were prepared.

| Solution A | titanium isopropoxide | |
| --- | --- | --- |
| | $(Ti(O-iC_3H_7)_4)$ | 5 wt % |
| | isopropylalcohol | 95 wt % |
| Solution B | $(MeO)_3SiCH_2CH_2(CF_2)_6$ | |
| | $CH_2CH_2Si(OMe)_3$ | 1 wt % |
| | HCl | 0.05 wt % |
| | isopropylalcohol | balance |

The solution A was stirred and ripened for two hours while being reacted (hydrolyzed) with moisture in air. Thereafter, the solution A was coated on a faceplate of a 25-inch color cathode-ray tube in an atmosphere at a relative humidity of 40% to 50% by a spin coating method.

A hot wind at about 100° C. was blown to dry the color cathode-ray tube under spinning for about one minute, and the solution B was coated by the spin coating method. Thereafter, the resultant structure was baked at 200° C. for 20 minutes to form an antireflection film according to the present invention. As shown in FIG. 5, the antireflection film formed on the faceplate 5 has a structure in which an upper layer 13 is stacked on a porous lower layer 12 and a portion of the upper layer 13 enters into pores 15. The thicknesses of the lower and upper layers 12 and 13 are about 150 and 100 nm, respectively. When a hardness test was performed for the antireflection film by using a scratch value test pencil in accordance with the JIS standards, the hardness was 7H. In the JIS K4500 hardness test, the cores of test pencils are exposed by 3 mm. End surfaces of the cores are flatted by an abrasive paper of 40# and is placed to have an angle of 45°, respectively. The end surfaces of them are vertically loaded by 1 kg and transferred in the horizontal direction by 3 mm at the rate of 0.5 mm/s such loading transferring is repeated five times. Film hardness is determined in the term of a pencil hardness when the film is damaged at a repeating number of two times or less. FIG. 7 is a view schematically showing a method of measuring specular reflection. As shown in FIG. 7, a fluorescent lamp 11 was used to measure the luminance of specular reflection at an incident angle of 30° by using a luminance meter (TOPCON BM-5 available from Tokyo Kogaku Sha K.K.) As a result, the specular reflection luminance of the obtained antireflection film was reduced by 27% with respect to that of a faceplate not having an antireflection film. That is, it was confirmed that the reflectance was largely reduced by using the antireflection film according to the present invention.

In this antireflection film, the refractive index of the lower layer changes in accordance with the formation conditions of the lower layer to change the antireflection effect of the film. Of the formation conditions, factors having influences on the refractive index of the lower layer are the composition of the solution A, the relative humidity upon coating, and the sintering temperature after the solution B is coated. A thin layer having a high porosity can be obtained when an amount of pure water added to the composition of the solution A upon hydrolysis is small, the relative humidity upon coating is high, and the baking temperature is about 200° C. or less. In Example 1, the solution A was ripened by using moisture in air without adding pure water to the composition of the solution A, coated in an environment at a relative humidity of 40% to 50%, and baked at 200° C. for 20 minutes, thereby adjusting the porosity.

As Control 1, the solution A was coated on a faceplate in an atmosphere at a relative humidity of 40% to 50% by the spin coating method and baked at a temperature of 200° C. to form a thin layer. The porosity of the formed thin layer was about 55%, and its refractive index was about 1.7.

As Control 2, the solution A was coated in an atmosphere at a relative humidity of 30% or less and baked at 200° C. to form a thin layer. The porosity of the formed thin layer was about 25%, and its refractive index was 2 or more. After the solution A coated in an atmosphere at a relative humidity of 30% or less was dried with a hot wind at about 100° C. for one minute following the same procedures as described above, the solution B was coated, and the resultant structure was sintered at 200° C. The obtained thin film had almost no antireflection characteristics. In addition, the film hardness of the thin film was as low as 5H, i.e., unsatisfactory for a practical use. It is assumed that no antireflection effect was obtained because the refractive index was increased too high due to a low porosity of the lower layer.

EXAMPLE 2

An antireflection film according to the present invention was formed following the same procedures as in Example 1 except that 1.0 wt % of acid-rhodamine B was added to the solution A. When the specular reflection luminance of this color cathode-ray tube was measured and compared with a luminance of a faceplate not having an antireflection film, it was reduced by 25%. This value is substantially the same as that obtained in Example 1.

Figure 8:
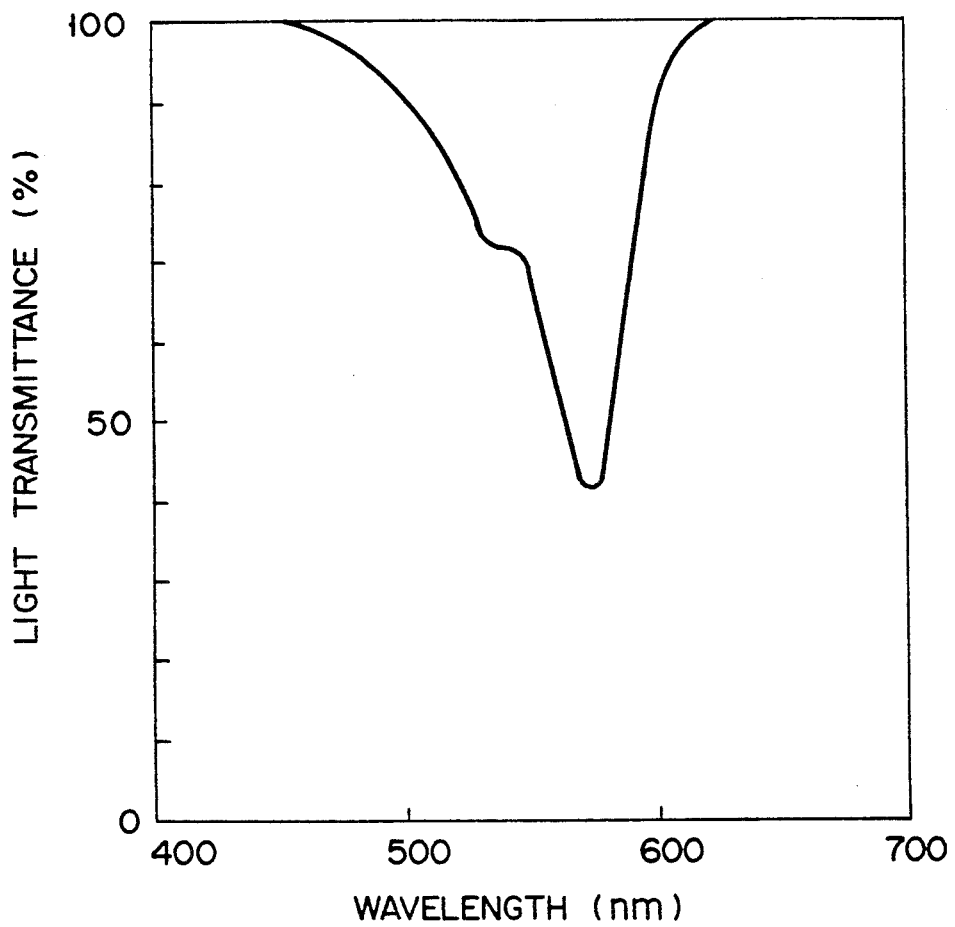
FIG. 8 is a graph showing the light transmittance of another embodiment of an optical film according to the present invention as a function of a wavelength.

FIG. 8 shows the light transmittance of the antireflection film obtained as described above with respect to wavelength. As is apparent from FIG. 8, this antireflection film has an optical filter function having a light selective absorbency. The BPC of the color cathode-ray tube having the antireflection film was 1.25, and good contrast characteristics and a good body color were obtained. In this manner, an excellent light selective absorbency was imparted to the film by adding a dye to the lower layer.

When this antireflection film was dipped in water at room temperature for 500 hours, no change was found in light selective absorbency. When a film having only a similar lower layer was dipped in water at room temperature for 48 hours, however, a dye almost completely eluted, and no light selective absorbency remained. In addition, a rubbing test was performed by using a cloth dampened with a commercially available bleaching agent containing sodium hypochlorite. As a result, while no change was found in the antireflection film according to the present invention, no light selective absorbency remained in the film having only the lower layer.

Conspicuous improvements can be also obtained in an ultraviolet resistance. For example, when ultraviolet rays of 100 mW/cm$^2$ were radiated by a metal halide lamp for four hours, the survival ratio of light selective absorbency of the optical film according to the present invention was 93%, while that of a film having only a lower layer was 75%. As described above, a display device comprising the optical film according to Example 2 has a good contrast and can stably maintain the light selective absorbing characteristics and the antireflection characteristics for a long time period.

Note that the effect of the upper layer as a protection film can be obtained not only when a coloring material is added to the lower layer but also when it is added to the upper layer and/or the lower layer.

EXAMPLE 3

An antireflection film was formed following the same procedures as in Example 1 except that 0.3 wt % of acid-rhodamine B were added to the solution B. When the specular reflection luminance of the antireflection film of the obtained color cathode-ray tube was measured, it was reduced by 27% as compared with that of a faceplate not having an antireflection film. This value was substantially the same as that obtained in Example 1. The obtained antireflection film had a light selective absorbency as shown in FIG. 8. The BCP of the color cathode-ray tube having this antireflection film was 1.22, and good contrast characteristics were obtained. In addition, since the upper layer containing a dye was excellent in water repellency and stain resistance, a water resistance, a chemical resistance, and an ultraviolet resistance of the film were conspicuously improved as in Example 2.

EXAMPLE 4

An antireflection film was formed following the same procedures as in Example 1 except that 0.5 wt % of lithium nitrate were added as a hygroscopic metal salt to the solution A. The specular reflection luminance of the obtained antireflection film was reduced by 28% as compared with that of a faceplate not having a reflection film. This antireflection film had conductivity because the hygroscopic metal salt was contained, and its surface resistivity was $1.0 \times 10^9$ $\Omega$/cm$^2$.

EXAMPLE 5

An antireflection film was formed following the same procedures as in Example 1 except that 0.1 wt % of lithium nitrate were added as a hygroscopic metal salt to the solution B. The specular reflection luminance of the obtained antireflection film was reduced by 27% as compared with that of a faceplate not having an antireflection film. This antirefection film had conductivity because the hygroscopic metal salt was contained, and its surface resistivity was $3.0 \times 10^9$ $\Omega$/cm$^2$.

EXAMPLE 6

Antireflection films were formed following the same procedures as in Example 1 except that 0.45, 1.2, and 2.1 wt % of tetraethyl silicate ($Si(OC_2H_5)_4$) were added to the solution A. The specular reflection luminances of the obtained antireflection films were reduced by 26% to 30% as compared with that of a faceplate not having an antireflection film. The film hardnesses of the films were 7H, 6H, and 5H, i.e., reduced as the addition amount was increased. Since a desired film hardness is practically 6H or more, the $TiO_2$ content of the lower layer is preferably 80 wt % or more.

EXAMPLE 7

Figure 9:
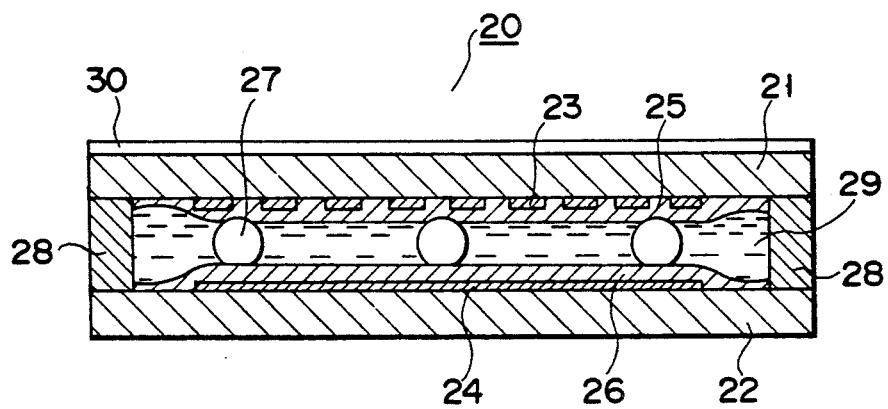
FIG. 9 is a sectional view showing a practical structure of a liquid crystal display device according to the present invention.

FIG. 9 is a sectional view showing a liquid crystal display device according to another embodiment of the present invention. Referring to FIG. 9, this liquid crystal display device comprises a pair of glass substrates 21 and 22, and electrodes 23 and 24 consisting of, e.g., ITO (indium tin oxide) and having desired patterns are formed on the opposing major surfaces of the substrates. Orientation films 25 and 26 are coated on the electrodes 23 and 24, respectively, and the surfaces of the films 25 and 26 are rubbed in predetermined directions. A predetermined distance is kept between the orientation films 25 and 26 by heat-hardening adhesive spacers 27. The spacers 27 are spread on one of the two orientation films, e.g., the orientation film 26 beforehand and hardened and adhered upon heating at a temperature of about 100° C. A liquid crystal 29 is sandwiched between the orientation films 25 and 26 and sealed by a sealing member 28 formed on peripheral portions of the films 25 and 26 so as to surround the liquid crystal 29, thereby forming a liquid crystal display device 20.

An antireflection film 30 constituted by upper and lower layers is formed on the outer surface of at least one of the substrates 21 and 22 of the liquid crystal display device 20.

This antireflection film 30 was formed by the following method. That is, the entire liquid crystal display device except for the substrate outer surface portions was sealed, and the sealed structure was dipped in the solution A used in Example 1 and then vertically pulled up, thereby coating the solution A. Thereafter, the resultant structure was dried in an atmosphere at a relative humidity of 40% to 50% by blowing a hot wind at a temperature of about 50° C. for one minute, dipped in the solution B, and then vertically pulled up, thereby coating the solution B. The resultant structure was dried by a hot wind at about 50° C. for 20 minutes to form an antireflection film. Pulling rates for the lower and upper layers were adjusted to obtain film thicknesses of about 150 nm and 100 nm, respectively. The specular reflection luminance of this liquid crystal display device was reduced by about 28% as compared with that of a liquid crystal device not having this antireflection film.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A display device comprising:
   a display screen; and
   an optical film formed on said display screen, said optical film having a porous lower layer and an upper layer formed thereon, said porous lower layer including TiO$_2$ and having a porosity of 30% to 75% and an average pore size of not more than 10 nm, said upper layer including a silicon compound having a fluorine-containing group and a siloxane bond.

2. A device according to claim 1, wherein the porosity of said porous lower layer is 45% to 65%.

3. A device according to claim 1, wherein the average pore size of said porous lower layer is 5 to 10 nm.

4. A device according to claim 1, wherein a refractive index of said optical film is 1.5 to 2.0.

5. A device according to claim 1, wherein said upper layer is obtained by performing hydrolysis and dehydrating condensation for alkoxysilane having a fluorine-containing group.

6. A device according to claim 1, wherein said porous lower layer is obtained by hydrolyzing at least one titanium alkoxide selected from the group consisting of titanium propoxide, titanium isopropoxide, titanium butoxide, titanium isobutoxide, titanium ethoxide and titanium compound having alkoxy group.

7. A device according to claim 1, wherein said lower layer contains a hygroscopic metal salt.

8. A device according to claim 1, wherein said upper layer contains a hygroscopic metal salt.

9. A device according to claim 1, wherein within a wavelength range of 400 to 650 nm, light absorbing characteristics of said porous lower layer have a peak in a wavelength range of 575±20 nm and satisfy the following relations:

$$T_{min} \leq T_{550} < T_{530}$$

$$1 \leq T_{450}/T_{530} \leq 2$$

$$1 \leq T_{630}/T_{530} \leq 2$$

$$0.7 < T_{450}/T_{630} \leq 1.43$$

where transmittances with respect to light having wavelengths of 450, 530, 550, 630 nm and a peak are $T_{450}$, $T_{530}$, $T_{550}$, $T_{630}$, and $T_{min}$, respectively.

10. A device according to claim 9, wherein said porous lower layer includes contains at least one coloring material selected from the group consisting of a dye, an organic pigment, and an inorganic pigment.

11. A device according to claim 1, wherein within a wavelength range of 400 to 650 nm, light absorbing characteristics of said upper layer have a peak in a wavelength range of 575±20 nm and satisfy the following relations:

$$T_{min} \leq T_{550} < T_{530}$$

$$1 \leq T_{450}/T_{530} \leq 2$$

$$1 \leq T_{630}/T_{530} \leq 2$$

$$0.7 < T_{450}/T_{630} \leq 1.43$$

where transmittances with respect to light having wavelengths of 450, 530, 550, 630 nm and a peak are $T_{450}$, $T_{530}$, $T_{550}$, $T_{630}$, and $T_{min}$, respectively.

12. A device according to claim 11, wherein said upper layer includes at least one coloring material selected from the group consisting of a dye, an organic pigment, and an inorganic pigment.

13. A device according to claim 1, wherein within a wavelength range of 400 to 650 nm, light absorbing characteristics of whole of said porous lower layer and said upper layer have a peak in a wavelength range of 575±20 nm and satisfy the following relations:

$$T_{min} \leq T_{550} < T_{530}$$

$$1 \leq T_{450}/T_{530} \leq 2$$

$$1 \leq T_{630}/T_{530} \leq 2$$

$$0.7 < T_{450}/T_{630} \leq 1.43$$

where transmittances with respect to light having wavelengths of 450, 530, 550 630 nm and a peak are $T_{450}$, $T_{530}$, $T_{550}$, $T_{630}$, and $T_{min}$, respectively.

14. A device according to claim 1, wherein said display device is a cathode-ray tube.

15. A device according to claim 1, wherein said display device is a liquid crystal display device.

16. A device according to claim 13, wherein said porous lower layer and said upper layer each include at least one coloring material selected from the group consisting of a dye, an organic pigment, and an inorganic pigment.

* * * * *